United States Patent [19]

Amann et al.

[11] 4,109,955
[45] Aug. 29, 1978

[54] GLOVE COMPARTMENT FOR MOTOR VEHICLES

[75] Inventors: Rolf Amann, Renningen; Horst Seidl, Boeblingen, both of Fed. Rep. of Germany

[73] Assignee: Daimler-Benz Aktiengesellschaft, Fed. Rep. of Germany

[21] Appl. No.: 736,493

[22] Filed: Oct. 28, 1976

[30] Foreign Application Priority Data

Nov. 3, 1975 [DE] Fed. Rep. of Germany ....... 2549071

[51] Int. Cl.² ............................................... B60R 5/02
[52] U.S. Cl. .................................... 296/37.1; 188/1 C
[58] Field of Search ........................... 296/37.1, 37.12; 280/750, 777; 188/1 C; 180/82 R

[56] References Cited

U.S. PATENT DOCUMENTS

| 2,202,277 | 5/1940 | Visser | 296/37.12 X |
| 2,298,415 | 8/1942 | Richardson | 296/37.12 |
| 3,434,367 | 3/1969 | Renneker | 280/777 X |
| 3,511,345 | 5/1970 | Takamatsu | 188/1 C |

*Primary Examiner*—Robert R. Song
*Assistant Examiner*—R. Schrecengost
*Attorney, Agent, or Firm*—Craig & Antonelli

[57] ABSTRACT

A glove compartment for motor vehicles which is adapted to be closed, preferably by a cover arranged in the instrument panel, and which is formed by a housing retained within the area of the instrument panel; the housing is provided with at least one circumferential weakening line which effects a reduction of the depth of the housing in case of a force interaction on the glove compartment directed opposite to the driving direction.

14 Claims, 5 Drawing Figures

GLOVE COMPARTMENT FOR MOTOR VEHICLES

The present invention relates to a glove compartment for motor vehicles which is adapted to be closed preferably by a lid arranged in the instrument panel and which is formed by a housing retained within the area of the instrument panel.

The housings of glove compartments generally used at present in the motor vehicle construction inherently possess a relatively high rigidity. This entails the disadvantage that when driving a vehicle equipped with such a glove compartment against an obstacle, for example, in case of a front end collision, aggregates arranged in the engine space or in a forwardly disposed luggage space, which may then impinge against the bottom portion of the housing, may so load and stress the same that the lid is pushed open and projects into the interior space of the vehicle as a structural part endangering the passengers.

The present invention is therefore concerned with the task to avoid these disadvantages and to provide a glove compartment for motor vehicles which under no circumstances can represent an additional safety hazard for the vehicle passengers.

The underlying problems are solved according to the present invention with a glove compartment of the aforementioned type in that the housing has at least one circumferential weakening line which effects a reduction of the depth of the housing with a force interaction on the glove compartment directed opposite to the driving direction.

With a glove compartment whose housing consists of synthetic resinous material, wood-fiber material or the like, it is particularly advantageous if the weakening line is constructed as intentional breaking or rupturing line, which with a corresponding force interaction or force influence effects a reduction of the depth of the housing by a separation of parts thereof.

If, in contrast thereto, the housing of the glove compartment consists of a plastically deformable material such as, for example, sheet metal, it may be advantageous if the weakening line is constructed as offset or the like which with corresponding force interaction effects an inverting or parts of the housing.

Finally, it may be additionally favorable if several circumferential weakening lines disposed one behind the other are provided.

Additionally, it may be advantageous to provide the weakening lines with a perforation.

Accordingly, it is an object of the present invention to provide a glove compartment for motor vehicles which avoids by simple means the aforementioned shortcomings and drawbacks encountered in the prior art.

Another object of the present invention resides in the glove compartment for motor vehicles which eliminates the danger that the glove compartment or its lid may become a source of danger or injury for the passengers in case of an accident, especially in case of a front-end collision.

A still further object of the present invention resides in a glove compartment for motor vehicles which is simple in construction, yet effectively provides a protection for the passengers in case of front-end collisions.

These and other objects, features and advantages of the present invention will become more apparent from the following description when taken in connection with the accompanying drawing which shows, for purposes of illustration only, several embodiments in accordance with the present invention, and wherein.

Figure 1:
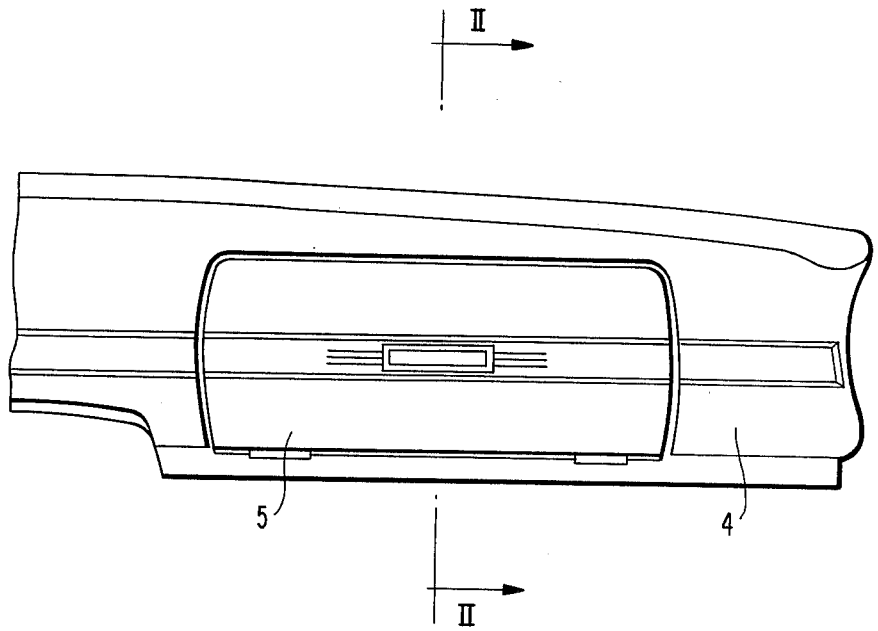
FIG. 1 is a partial elevational view of an instrument panel of a motor vehicle with a glove compartment in accordance with the present invention.

Referring now to the drawing wherein like reference numerals are used throughout the various views to designate like parts, the glove compartment illustrated in the various figures of the drawing consists of a housing generally designated by reference numeral 1 which is secured at the instrument panel 4 at 2 and 3 and which is adapted to be closed off by a lid 5. The bottom portion 6 of the housing 1 is constructed with smaller wall thickness than the remaining area thereof and passes over with step-shaped offsets or shoulders 7 and 8 into the area with greater wall thickness, whereby the offsets 7 and 8 act as intentional breaking line when the bottom portion 6 is correspondingly stressed or loaded. The location of the step-shaped offsets 7 and 8 is selected corresponding to the required deformation paths.

Figure 2:
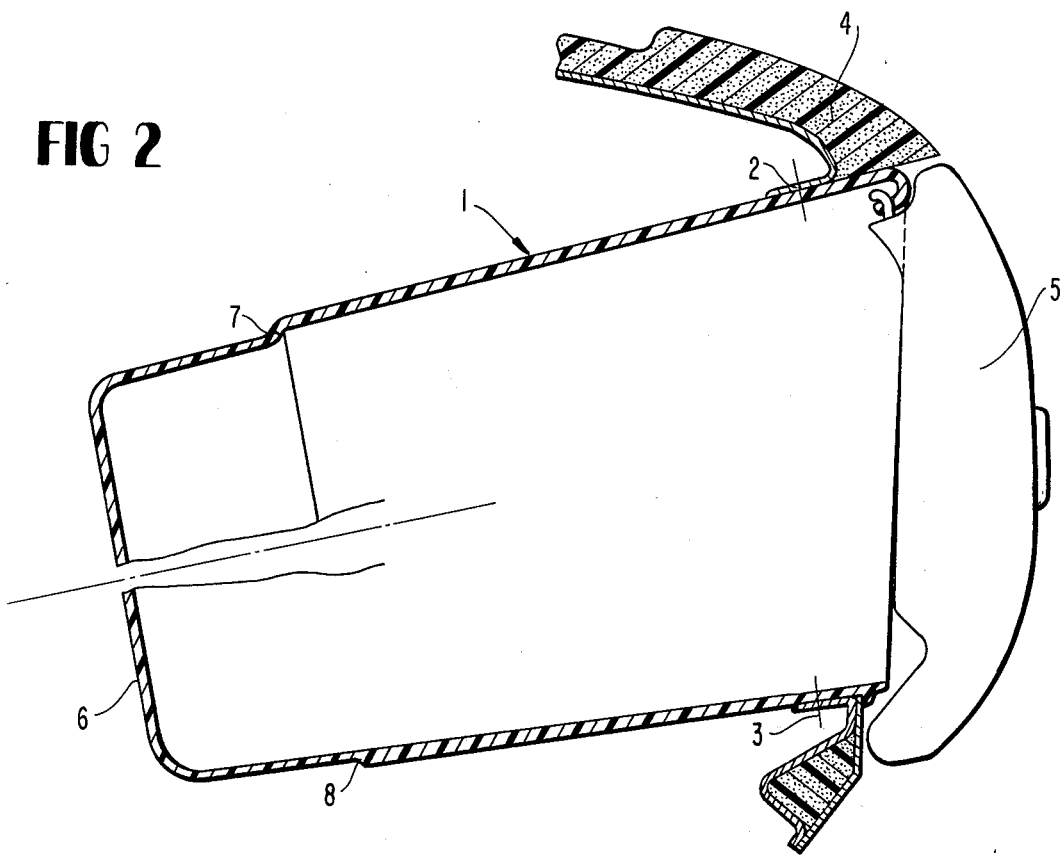
FIG. 2 is a cross-sectional view on an enlarged scale, through the glove compartment in accordance with the present invention, taken along line II—II of FIG. 1.
Figure 3:
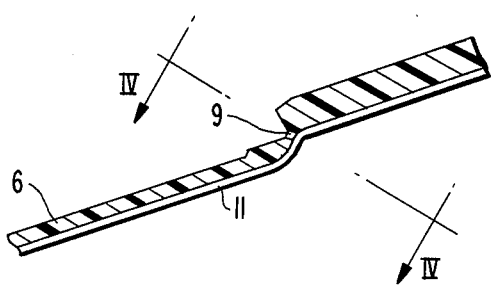
FIG. 3 is a partial cross-sectional view, similar to FIG. 2, illustrating a modified embodiment of a glove compartment in accordance with the present invention provided with an intentional breaking line.
Figure 4:
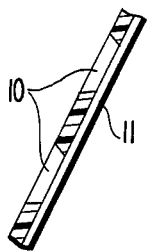
FIG. 4 is a partial cross-sectional view, taken along line IV—IV of FIG. 3.

An intentional breaking line 9 is illustrated in FIGS. 3 and 4 of the drawing, which is constructed similar to the offset 7 in the top part of FIG. 2, whereby, however, additional apertures 10 are provided within the area thereof. The inside of the housing 1 is provided in this case with an additional uninterrupted layer 11, for example, in the form of flocculation.

Figure 5:
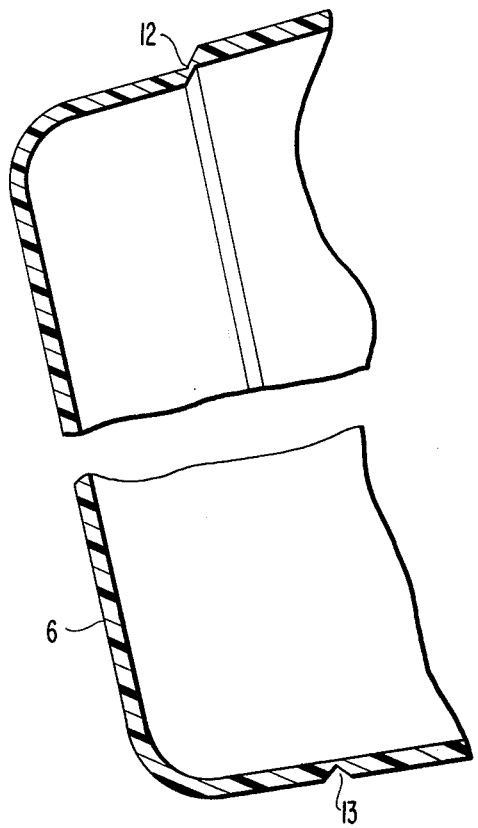
FIG. 5 is a partial cross-sectional view through the lower portion of the housing of the glove compartment with a still further modified construction of the intentional breaking line in accordance with the present invention.

Finally, two further embodiments of intentional breaking lines are illustrated in FIG. 5, and more particularly in the top part thereof in the form of an offset 12 without a wall thickness reduction and in the lower part thereof in the form of a notch 13.

While we have shown and described several embodiments in accordance with the present invention, it is understood that the same is not limited thereto but is susceptible of numerous changes and modifications as known to those skilled in the art, and we therefore do not wish to be limited to the details shown and described herein but intended to cover all such changes and modifications as are encompassed by the scope of the appended claims.

We claim:

1. A glove compartment for motor vehicles, which comprises a housing means retained within the area of the instrument panel, characterized in that the housing means is provided with at least one circumferential weakening means which effects a reduction of the depth of the housing means in case of a force interaction on the glove compartment directed opposite the driving direction.

2. A glove compartment according to claim 1, characterized in that the housing has a first portion of a first wall thickness and a second portion of a second wall thickness and said weakening means is essentially formed by a line between said first and second portions weakening the structure of the housing means.

3. A glove compartment according to claim 1, characterized in that the weakening means is constructed as an intentional breaking line which with a corresponding force interaction effects a reduction of the depth of the housing means by separation of parts thereof.

4. A glove compartment according to claim 3, characterized in that the bottom portion of the housing means is separated from the remaining part thereof with a corresponding force interaction.

5. A glove compartment according to claim 4, characterized in that the housing means consists of synthetic resinous material or wood-fiber material.

6. A glove compartment according to claim 1, wherein said housing means is formed of a plastically deformable material, and characterized in that the weakening means is constructed as a offset means for causing parts of the housing means to invert when a corresponding force interaction is applied.

7. A glove compartment according to claim 6, characterized in that the housing means consists of sheet metal.

8. A glove compartment according to claim 2, characterized in that said circumferential weaking means comprises several circumferential weakening lines which are arranged one behind the other.

9. A glove compartment according to claim 8, characterized in that the weakening lines are provided with apertures.

10. A glove compartment according to claim 9, characterized in that the glove compartment includes by a lid arranged in the instrument panel.

11. A glove compartment according to claim 1, characterized in that several circumferential weakening means are provided which are arranged one behind the other.

12. A glove compartment according to claim 11, characterized in that each weakening means is provided with a perforation.

13. A glove compartment according to claim 8, characterized in that the weakening means is constructed as an intentional breaking line which with a corresponding force interaction effects a reduction of the depth of the housing means by separation of parts thereof.

14. A glove compartment according to claim 8, wherein said housing means is formed of a plastically deformable material, and characterized in that the weakening means is constructed as an offset for causing parts of the housing means to invert when a corresponding force interaction is applied.

* * * * *